United States Patent [19]

van der Lely et al.

[11] 4,254,834

[45] Mar. 10, 1981

[54] SOIL WORKING MACHINE

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 937,471

[22] Filed: Aug. 28, 1978

[30] Foreign Application Priority Data

Sep. 1, 1977 [NL] Netherlands ............... 7709622
Jul. 17, 1978 [NL] Netherlands ............... 7807622

[51] Int. Cl.³ ............................................. A01B 33/02
[52] U.S. Cl. ........................................ 172/112; 172/123
[58] Field of Search ............... 172/112, 123, 49, 45, 172/51, 96, 52, 113, 60

[56] References Cited

U.S. PATENT DOCUMENTS

| 3,347,188 | 10/1967 | Richey | 172/112 X |
| 3,521,712 | 7/1970 | Lely | 172/112 |
| 3,532,169 | 10/1970 | Lely | 172/113 |
| 3,538,987 | 11/1970 | Taylor | 172/112 |
| 3,542,133 | 11/1970 | Lely | 172/112 |
| 3,557,879 | 1/1971 | Lely | 172/112 |
| 3,633,679 | 1/1972 | Dahlberg | 172/123 |
| 3,768,572 | 10/1973 | McCanse | 172/112 |
| 3,892,278 | 7/1975 | Smith | 172/112 |
| 4,051,902 | 10/1977 | Lely | 172/112 |

FOREIGN PATENT DOCUMENTS

| 252068 | 5/1963 | Australia | 172/112 |
| 414410 | 5/1925 | Fed. Rep. of Germany | 172/112 |
| 6513547 | 4/1967 | Netherlands | 172/112 |
| 6514842 | 5/1967 | Netherlands | 172/112 |
| 6702737 | 8/1968 | Netherlands | 172/112 |

Primary Examiner—Richard J. Johnson
Attorney, Agent, or Firm—Mason, Mason and Albright

[57] ABSTRACT

A soil working machine has spaced apart groups of soil working tines mounted along the length of an elongated carrier that is driven to rotate through the soil in the normal direction of travel and about a horizontal transverse axis. A hood partially surrounds the groups and is positioned adjacent the front segment of the paths of the tines as they move worked soil upwardly. Portions of the hood, preferably adjacent the groups, are flexible i.e. canvas, rubber or resilient steel strips, and vibrate to shed worked soil. Intervening hood portions are rigid. Side plates adjoin the side edges of the hood and the plates can have apertures covered by flexible portions located at those areas exposed to sticky soil and these flexible portions can be arcuate in configuration.

18 Claims, 11 Drawing Figures

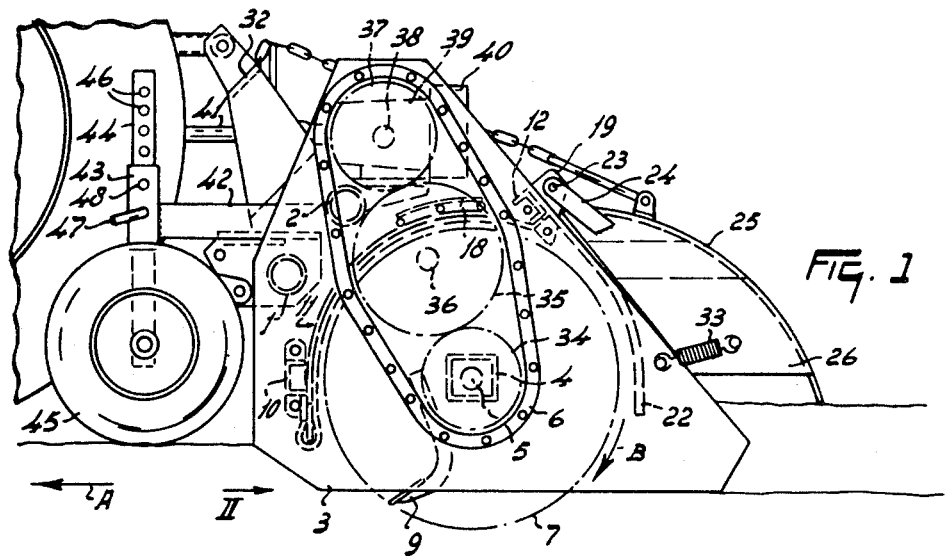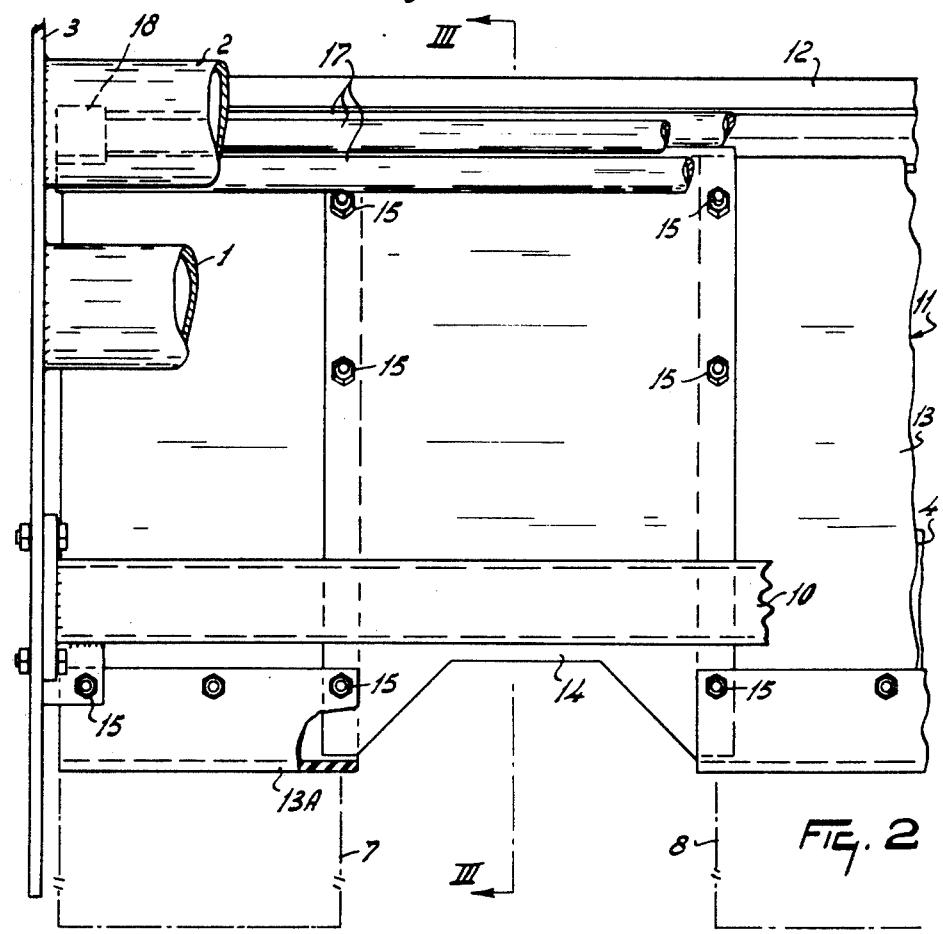

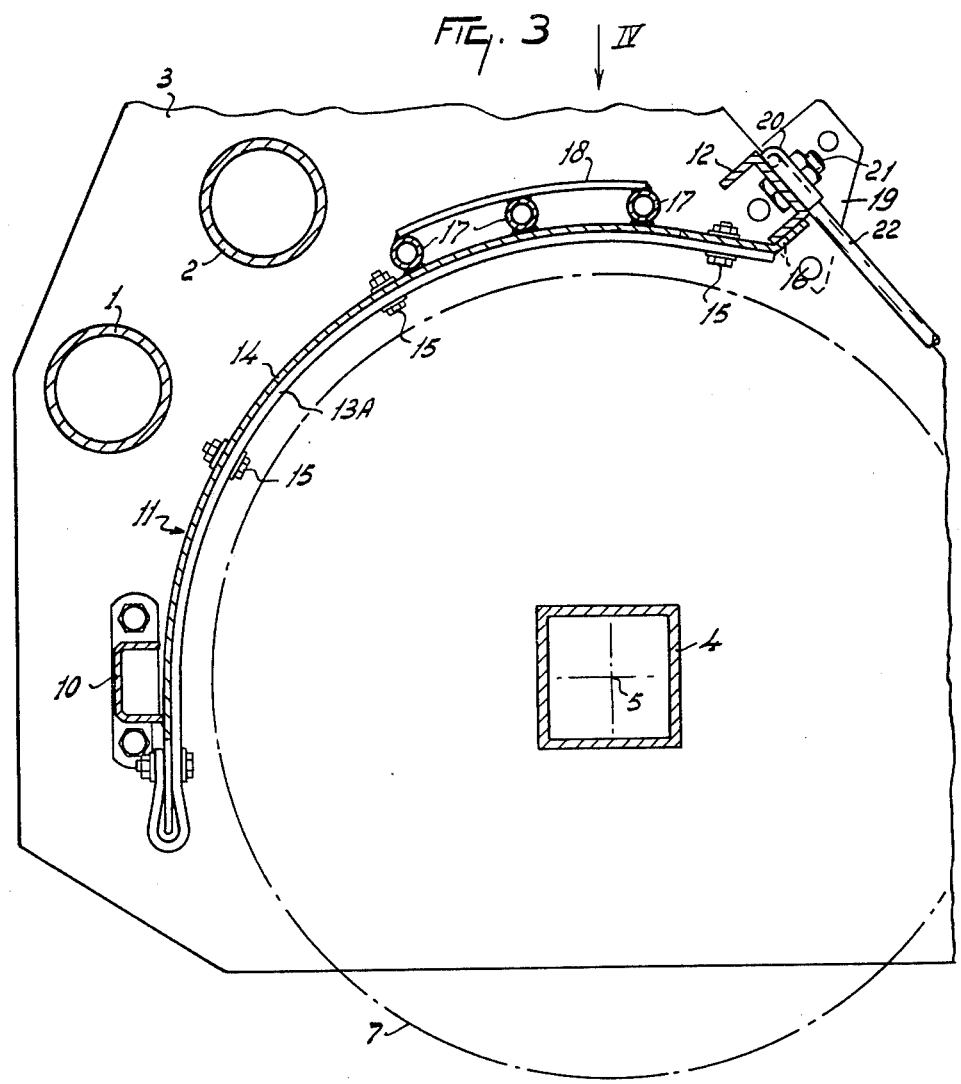

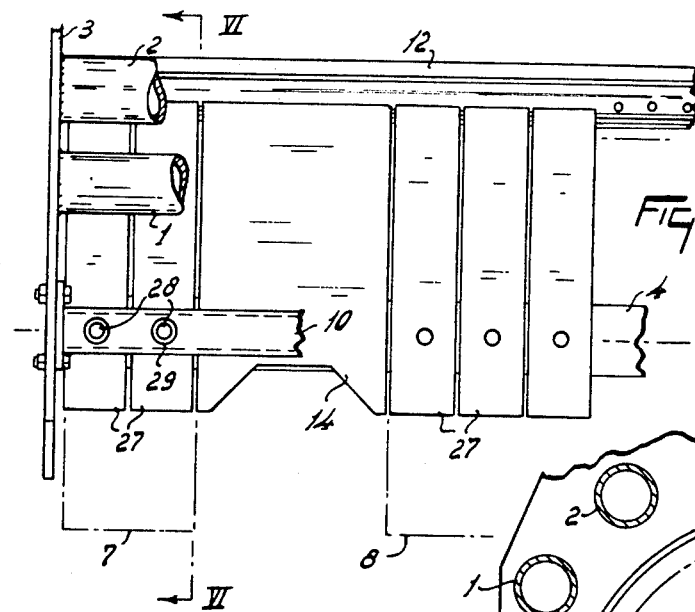
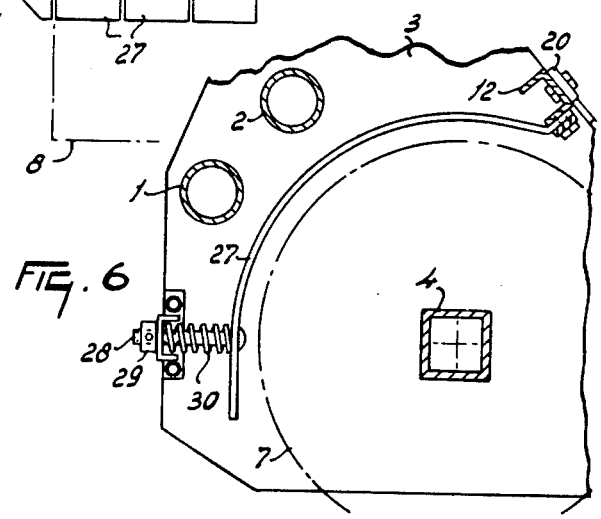
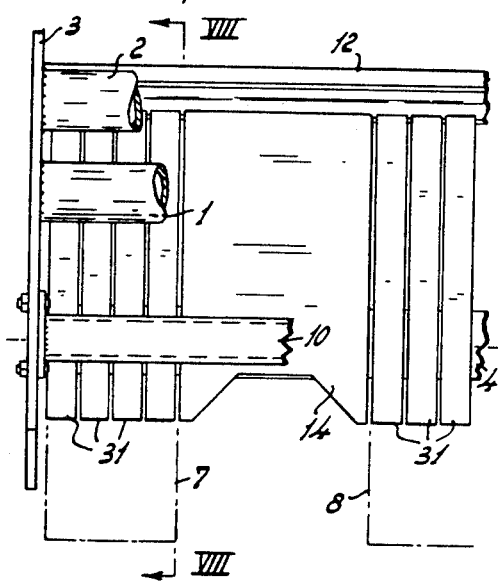
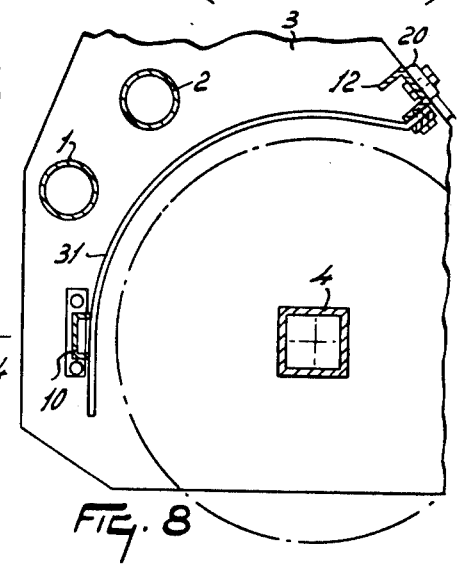

SOIL WORKING MACHINE

This invention relates to a soil working machine.

According to the present invention there is provided a soil working machine comprising at least one working member which is at least partly surrounded by a screening hood, the screening hood comprising rigid and flexible portions.

For a better understanding of the present invention and to show how it may be carried into effect, reference will now be made, by way of example only, to the accompanying drawings, in which:

FIG. 1 is a side elevation of a soil working machine;

FIG. 2 is an enlarged elevational view in the direction of the arrow II in FIG. 1;

FIG. 3 is an elevational view taken on the line III—III in FIG. 2;

FIG. 5 is an elevational view of a second embodiment of the part illustrated in FIG. 2;

FIG. 6 is an elevational view taken on the line VI—VI in FIG. 5;

FIG. 7 is an elevational view of a third embodiment of the part shown in FIG. 2; and FIG. 8 is an elevational view taken on the line VIII—VIII in FIG. 7.

Figure 4:
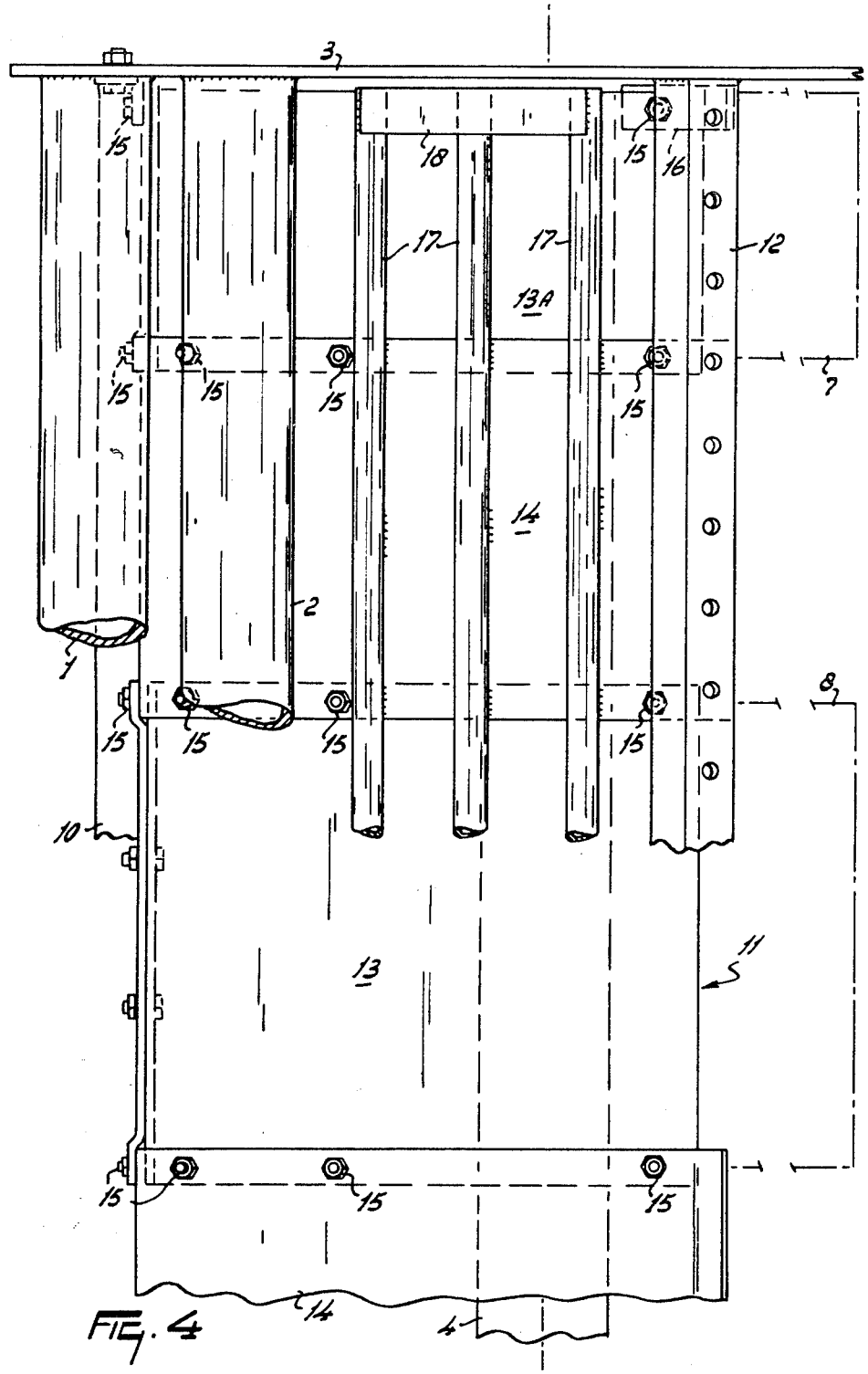
FIG. 4 is an enlarged, partial plan view taken in the direction of the arrow IV in FIG. 3.

The soil working machine shown in the Figures comprises a frame having two parallel frame beams 1 and 2 extending transversely of the intended direction of operative travel, indicated by an arrow A. The frame beams 1 and 2, as shown in FIG. 1, are located one behind the other and at different vertical levels, the rearmost frame beam 2 being at the higher level. The frame beams 1 and 2 are arranged between upwardly extending (and preferably vertical) rearwardly extending plates 3. Substantially midway between the front and rear edges of the plates 3 and, with respect to their height, below the center, is mounted a rotatable, hollow carrier 4 which is arranged between the plates 3 and is supported by stub shafts 5 in bearings (not shown) mounted on the plates 3. The stub shaft 5 on one side of the machine extends beyond its plate 3 into a gear box 6, in which is arranged a driving gear mechanism for the carrier 4. This mechanism will be described later in this description. The carrier 4 is provided with groups of tines 7 and 8 which are indicated schematically in FIGS. 2, 3 and 4. Near each end of the carrier 4 is arranged a group of tines 7, and between these groups are arranged further groups of tines 8 at equal intervals from one another, these intervals being equal to the distance between each group of tines 7 and its adjacent group of tines 8. Each group of tines 7 and 8 comprises a plurality of diametrically opposite pairs of cultivating members or tines 9 on the carrier 4. The number of tines 9 of each outermost group 7 is half the number of tines 9 of each intermediate group 8. At the front, substantially beneath the frame beam 1, is a beam 10 (FIGS. 1 and 3), which is arranged between the plates 3, to which beam is secured the lower edge of a screening hood 11. The screening hood 11 surrounds the carrier 4 and the groups of tines 9 thereon over a circumferential angle of at least 90°. At its rear edge it is fastened to an angle-section iron 12 secured between the plates 3. The screening hood 11 consists of flexible portions 13, 13A and rigid portions 14 arranged on the beams 10 and 12 and being alternately located one beside the other. The dispositions of the flexible portions 13 and 13A is such that they are located in the regions of the groups of tines 7 and 8 respectively. Since the groups 7 comprise a smaller number of tines than the groups 8, the width of the flexible portions 13A is smaller than that of the flexible portions 13. Each of the flexible portions 13 and 13A has a width corresponding substantially with the working width of the respective groups of cultivating members. Each flexible portion 13 and 13A comprises a strip of flexible material, for example, canvas. Alternatively, rubber may be used. The canvas strips are secured by bolts 15 to rigid sheet parts 14. At the lower edge the canvas is folded upwards. The strips 13A on the outer side of the screening hood are fixed at the top to a support 16, which is arranged on the beam 12 (FIGS. 3 and 4). The rigid portions 14 are inter-connected by three parallel tubes 17 which extend substantially over the whole length of the screening hood 11 and are inter-connected at their ends by strips 18. The angle-section iron 12 is connected with the plates 3 by fastening plates 19 at the ends (FIG. 1). At the rear edge, the plates 19 extend beyond the plates 3. The angle-section iron 12, extending parallel to the beams 1 and 2, is fitted with spring steel parallel bars 22. These bars are disposed at equal intervals of preferably about 3.5. cms and are connected to the angle-section iron by clamping pieces 20 and bolts 21. The bars 22 extend from their fastening points for some distance in a downwardly inclined straight line and then curve downwardly. The bars 22 form a grating and their ends are located substantially at the level of the carrier 4. To those parts of the fastening plates 19 which extend beyond the plates 3 is connected a downwardly curved screening hood 25 which is mounted for pivotal movement at each end on a stub shaft 23 and an arm 24. The hood 25 covers the bars 22; the lower edge of the screening hood 25 is also located at the level of the carrier 4. Beneath the screening hood 25 are arranged four V-shaped pairs of sheet material guide members 26. The guide members 26 have a straight shape and join the inner side of the screening hood 25. At the front the guide members 26 are inclined downwardly and rearwardly from the top, where they are in direct proximity of the grating of bars 22 (FIG. 1). The lower edges of the guide members 26 extend towards the lower edge of the hood 25. The guide members 26 of adjacent pairs meet one another at the top and are secured to a substantially vertical plate fastened to the inner side of the screening hood 25. Viewed in the direction A, the outermost groups of tines 7 are located directly in front of the outermost pairs of guide members 26, whereas the intermediate groups of tines 8 are located with their center substantially directly in front of the plate to which are fastened the guide members 26 of adjacent pairs.

In a further embodiment the screening hood 11 comprises flexible portions formed by contiguous strips 27 having each a width of preferably about 10 cms; these strips may be made from spring steel (FIGS. 5 and 6). The strips 27 are movable against spring force along a guide 28. By means of a nut 29 co-operating with a screwthread at the free end of the guide 28 the tension of a spring 30 surrounding the guide can be adjusted. In the embodiment shown in FIGS. 7 and 8 the respective flexible portions comprise a number of contiguous spring steel strips 31 having a width of preferably about 5 cms. The strips 31 are fastened at the top to the beam 12 and bear near their lower edges on the rearwardly facing side of the beam 10 (FIG. 8). As in the preceding embodiment, the lateral edges of the strips are preferably parallel to a plane perpendicular to the longitudinal center line of the carrier 4.

Near the center, the frame beams 1 and 2 are provided with a trestle 32 by means of which the machine can be attached to the three-point lift of a tractor. At the side of the machine, between the screening hood 25 and plate 3 is a tensile spring 33 for drawing the screening hood downwards during operation.

The stub shaft 5 is provided, at a position inside the gear box 6, with a pinion 34 which is drivably in mesh with a larger pinion 35 mounted on a shaft 36 which is journalled in the plates 3. The pinion 35 is drivably in mesh with a pinion 37 having the same diameter as the pinion 34. The pinion 37 is mounted non-rotatably on a shaft 38 arranged in a tube extending substantially parallel to the frame beams 1 and 2 and joining a gear box 39. Inside the gear box 39 the shaft 38 is linked in a manner not shown through a bevel pinion transmission to a shaft which extends in the direction A and is connected through a change-speed gear 40, on the rear of the gear box, with an adjacent shaft projecting from the front of the gear box which is coupled through an auxiliary shaft 41 with the power take-off of a tractor moving the machine during operation. Some distance from each of the plates 3 there is a support which is arranged between the frame beams 1 and 2 and extends for some distance in front of the frame beam 1. The support is provided with a forwardly extending arm 42, which is provided at the end away from the support with a sleeve 43, the longitudinal centre line of which is substantially vertical. A carrier 44 is slidably mounted in the sleeve 43 and is vertically adjustable. The lower end of the carrier 44 is provided with a ground wheel 45. To provide the adjustment, the carrier has a plurality of holes 46, through any one of which a pin 47 can be passed, which can also be passed through either one of two overlying holes 48 in the sleeve.

Figure 9:
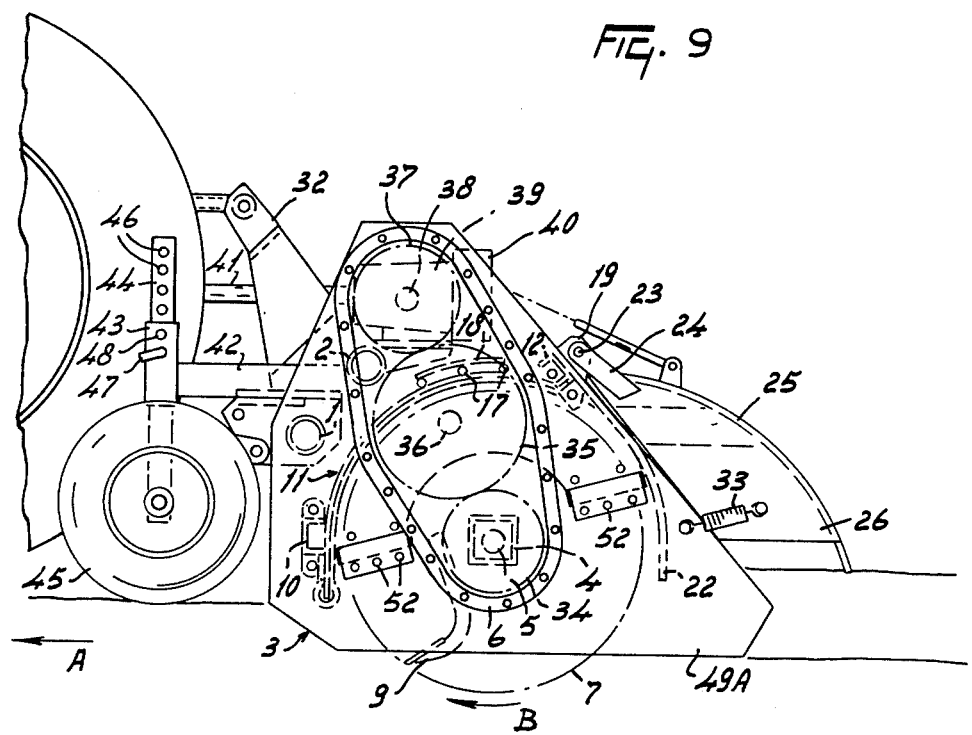
FIG. 9 is a side elevation of a soil working machine in accordance with the invention in a second embodiment.
Figure 10:
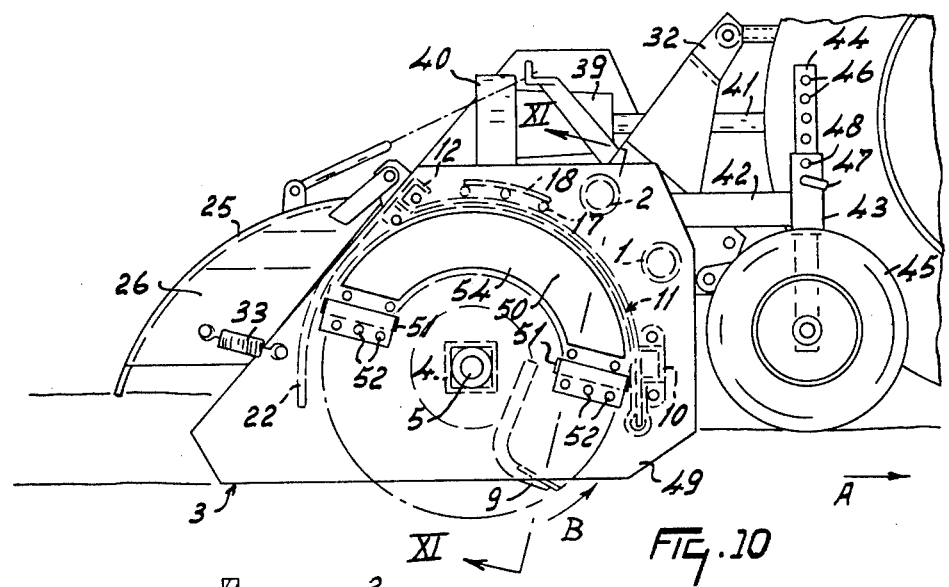
FIG. 10 is a side elevation of the opposite side of the machine shown in FIG. 9.
Figure 11:
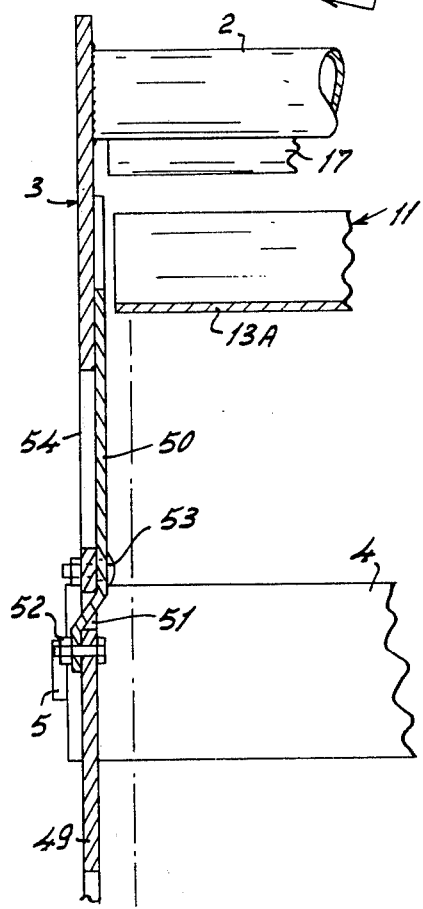
FIG. 11 is an elevational view taken on the line XI—XI in FIG. 10.

In the embodiment shown in FIGS. 9 to 11 the plates 3 comprise rigid portions 49 and 49A respectively, which are fastened in the manner described to the frame beams 1 and 2. On the inner sides of the plates 3 flexible portions 50 preferably of canvas or rubber are provided. As shown in FIG. 11 the flexible portions extend with respect to the carrier 4 in a radial direction as far as, preferably just beyond the periphery of the hood 11. The flexible portions 50 preferably are in fitting engagement with the edges of the adjacent flexible portions 13A. As shown in FIGS. 9 and 10, the flexible portions are arcuate and coaxial with the carrier 4, the circumferential angle preferably being about 180°. With respect to the direction of travel A the foremost end of the arc is located at lower level than the hindmost end. Adjacent the ends the flexible portions are passed through an opening 51 in the rigid portions 49 and 49A respectively and fastened to the outer side thereof with the aid of bolts 52. The flexible portions are furthermore fixed adjacent the opening 51 on the inner sides of the rigid plate. The flexible portions are preferably located near the upper half of the path described by the ends of the tines of the groups, viewed in a direction parallel to the carrier 4 and, measured with respect to the carrier 4, they preferably extend outwardly over a radial distance amounting to about 50% of the diameter of the path described by the outermost ends of the tines of the groups 7. Above the opening 51 the rigid plate 49 has an arcuate opening which has a radial dimension with respect to the carrier 4 which is about 40% of the radius of the path described by the ends of the tines of the groups 7. The circumferential angle of the opening 54 is preferably about 140°. As is shown in FIG. 9, the opening 54 is not provided on the side of the gear box 6. However in case the gear box 6 is disposed at a distance from the plate 49A an opening 54 can also be present on the side of the gear box 6. It should be noted that instead of providing an arcuate opening 54 a sequence of holes may be provided, the dimensions thereof being such that the flexible portions can move outwardly and laterally through said holes.

The machine described above, having a working width of about 3 meters, can be effectively used in earthing up potato plants in rows. The groups of tines 7 and 8 work the strips of soil between the rows of potato plants and they are driven in the direction B by the carrier 4 to move across the soil in the direction of movement A. During operation the tines 9 of the respective groups conduct upwards along the screening hood 11 a quantity of earth depending upon the working depth of the tines, as adjusted by means of the ground wheels 45. The earth is thrown over the carrier 4 towards the rear, while coarse objects in the earth such as root remnants, weeds and the like together with the coarse lumps of earth are conducted along the bars 22 into the furrows made by the tines. The rest of earth, perhaps crumbled up further, is passed between the bars 22 onto the guide members 26 of the respective pairs so that this earth is deposited through the recessed lower edges of the parts 14 in ridges on the rows of potatoes. During the movement of the earth thrown up by the tines along the flexible parts 13A and 13 of the screening hood 11, the flexibility prevents the earth from sticking to the screening hood, whereas otherwise the drive of the groups of tines would require an increase in power and the machine would finally become inoperative. The use of rubber has the advantage that the inner surface is smoother than that of canvas. The use of the strips prevents by the elasticity of the contiguous strips an undesirable tacking of earth.

Since sticking of earth may also occur near the upper part of the space bounded by the side plates 3 and the adjacent parts of the hood 11, it is very advantageous in the embodiment shown in FIGS. 9 to 11 that the flexible portions 50 prevent earth from sticking to said part of the side plate. This may be additionally prevented by the outward movability of the flexible portions through the opening 54, while the flexible portions can perform a vibratory motion. However, owing to the junction with the flexible portions 13A said flexible portions 50 provide a satisfactory guide during the deflection of the portions 13A. Since prevention of accumulation of earth is most important near that part of the path of the tines of the groups 7 where the tines essentially move upwardly, it is sufficient to provide the flexible portions over a limited circumferential angle.

While various features of the soil cultivating machine that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. A soil working machine comprising a frame and a plurality of soil working means, mounted on said frame for rotation about a substantially horizontal transverse axis, a hood member positioned above and adjacent said soil working means and extending throughout the working width of said machine, said soil working means comprising a plurality of laterally spaced apart groups of tools, driving means connected to rotate said tools to move worked soil through a path defined at least in part by said hood member, said hood member comprising a plurality of separate rigid and flexible sheet portions positioned across the width of the hood member, neighboring rigid portions being spaced apart and at least one flexible portion being positioned between said neighboring rigid portions generally in line with the working path of a group of tools, said rigid and flexible portions being arranged side-by-side and means interconnecting opposite sides of a rigid portion with adjacent flexible portions, the relative movements of said flexible portions preventing worked earth from sticking and accumulating on said hood means during operation.

2. A soil working machine as claimed in claim 1, in which said flexible portions are generally rectangular in configuration.

3. A soil working machine as claimed in claim 1, in which said flexible portions are made from deformable material secured to longitudinally extending edges of said hood member.

4. A soil working machine as claimed in claim 3, in which said flexible portions are made from deformable material secured, at locations between the longitudinally extending edges of the hood member, to the rigid portions thereof.

5. A soil working machine as claimed in claim 1, in which the flexible portions are resilient strip elements having edges which extend substantially parallel to a plane perpendicular to the rotary axis of said working members.

6. A soil working machine as claimed in claim 1, in which said hood member extends arcuately over an angle of about 90° around the axis of rotation of said soil working members.

7. A soil working machine as claimed in claim 1, in which the hood means comprises at least one side plate having at least one flexible part mounted adjacent said working members.

8. A soil working machine as claimed in claim 7, in which the side plate comprises both rigid and flexible portions, said hood member also including both rigid and flexible portions.

9. A soil working machine as claimed in claim 8, in which a flexible portion of said side plate is located adjacent the upper segment of the path described by the ends of at least one working member.

10. A soil working machine as claimed in claim 8, in which a flexible portion of the side plate, viewed in a direction parallel to the rotary axis of said carrier, has an arcuate shape and is substantially coaxial with said axis.

11. A soil working machine as claimed in claim 8, in which a flexible portion of said side plate extends in a radial direction relative to said axis, beyond the periphery of the hood member.

12. A soil working machine as claimed in claim 11, in which a flexible portion of said side plate joins a flexible portion of said hood member.

13. A soil working machine as claimed in claim 12, in which a rigid portion of said side plate has an opening, which is covered by the flexible portion of the plate and is arcuate in shape.

14. A soil working machine as claimed in claim 13, in which a circumferential angle of the top edge of said opening preferably is about 140°, and the foremost end of said arc is located at a lower level than the hindmost end thereof.

15. A soil working machine as claimed in claim 8, in which the flexible portion of the side plate is positioned at a shorter distance from said working members than the rigid portion thereof.

16. A soil working machine as claimed in claim 15, in which the flexible portion of said plate is fastened solely at the ends of said opening to the rigid portion of the plate.

17. A soil working machine as claimed in claim 1, in which each flexible portion comprises a plurality of elastically movable elements arranged side-by-side, and said elements are contiguous with one another.

18. A soil working machine as claimed in claim 17, in which the elements are resiliently supported at a leading, longitudinally-extending edge of the hood member and are movable against spring action along a guide adjacent said edge.

* * * * *